United States Patent [19]

Young

[11] 4,087,498
[45] May 2, 1978

[54] METHOD OF PRODUCING SULFUR PARTICLES
[75] Inventor: Donald C. Young, Fullerton, Calif.
[73] Assignee: Union Oil Company of California, Brea, Calif.
[21] Appl. No.: 627,660
[22] Filed: Oct. 31, 1975
[51] Int. Cl.² .............................................. B01J 2/06
[52] U.S. Cl. .................................... 264/11; 264/40.1; 425/143; 425/144
[58] Field of Search ................. 264/11, 40.1; 425/143, 425/144

[56] References Cited
U.S. PATENT DOCUMENTS 3,769,378  10/1973  Young et al. ........................... 264/11
3,933,958  1/1976  Hinyichs ............................ 264/40.6

Primary Examiner—Robert F. White
Assistant Examiner—James R. Hall
Attorney, Agent, or Firm—Richard C. Hartman; Dean Sandford; Michael H. Laird

[57] ABSTRACT

The relative crushing strength of porous sulfur particles formed by quenching molten sulfur in a highly turbulent zone created by the intersection of the molten sulfur stream and a high velocity water stream is controlled by controlling the temperature of the molten sulfur introduced into the turbulent zone. The hardness of the porous particles increases as sulfur temperature is increased.

4 Claims, 5 Drawing Figures

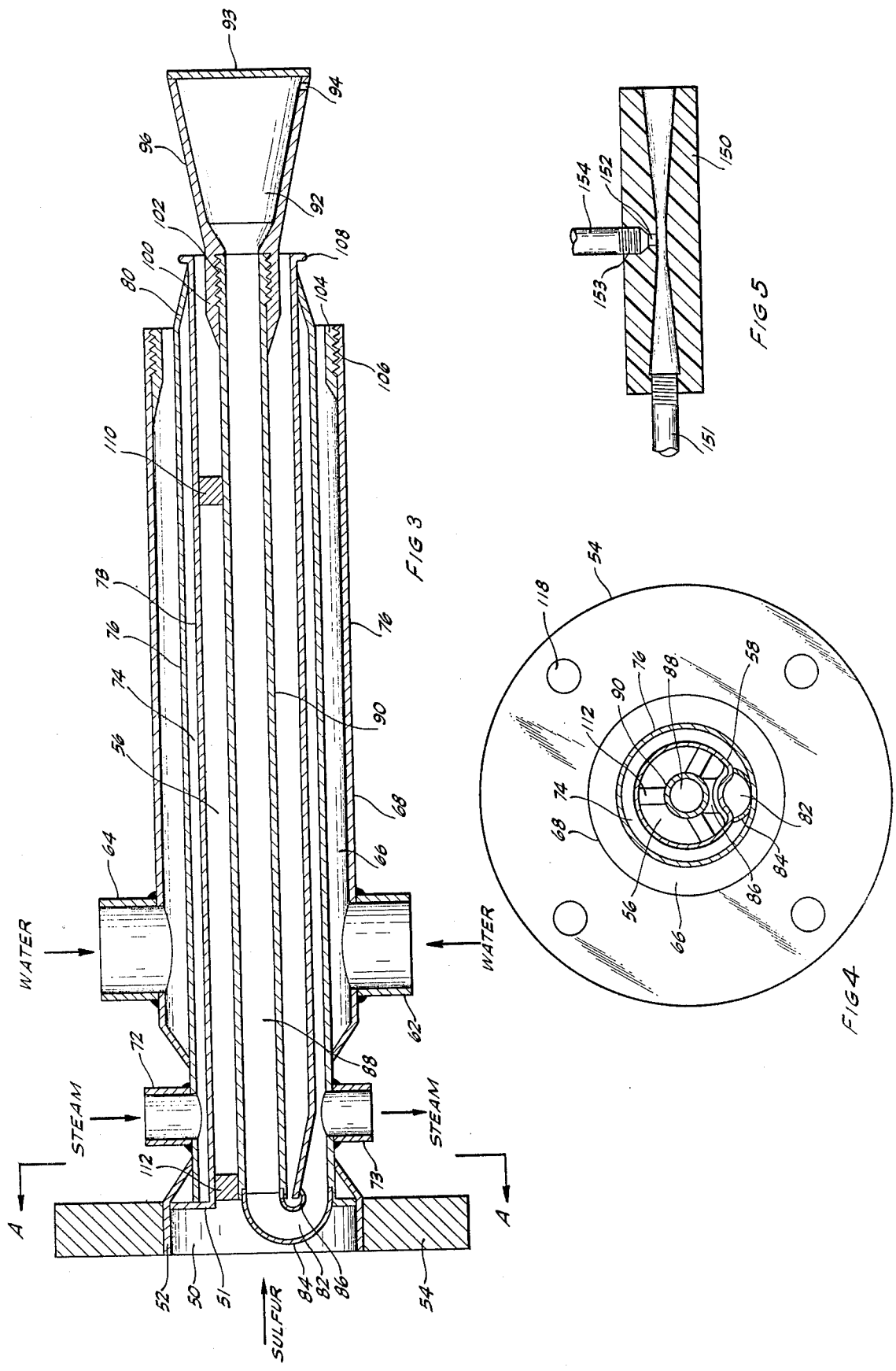

METHOD OF PRODUCING SULFUR PARTICLES

BACKGROUND OF THE INVENTION

Porous sulfur particles can be produced for molten sulfur by introducing a molten sulfur stream into a cooling water stream at a velocity sufficient to produce a highly turbulent zone at the point of intersection as described in U.S. Pat. Nos. 3,637,371, 3,769,378 and 3,830,361, incorporated here by reference. The resulting particles are highly porous and present substantial internal and external surface area and pore volume. As a consequence of these characteristics, the particles themselves have numerous utilities including their use as soil sulfur or simply as a more convenient form in which to store, ship or otherwise handle sulfur intended for any use.

In addition to these qualities, I have discovered that the porous particles produced as described in the above referenced patents can be abraded or otherwise crushed to form very small, finely divided sulfur spheres suitable for use in compounding rubber or other elastomers or plastics, as soil sulfurs, in the production of sulfur suspensions, or in any other application in which finely divided sulfurs are required. The finely divided sulfur beads obtained by mild abrasion of the larger porous particles, while extremely small in themselves, are non-dusting and exhibit much less tendency to build up static charges than do finely divided sulfurs obtained by other methods, e.g., crushing block sulfur or the like. Finer subdivision results from more severe crushing.

One set of physical properties might not be the best for all of the uses in which these materials find application. For instance, it might be preferable to minimize particle comminution when the larger particles are used only for shipment or storage. Conversely, particles of lower crushing strength might be more preferred for conversion to small sulfur beads or for direct use as soil or compounding sulfurs when particle attrition is desirable. Hence, it would obviously be advantageous to be able to produce the larger porous particles having either high or low crushing strength depending upon the intended end use. I have now discovered that this objective can be achieved by controlling the temperature of the molten sulfur introduced into admixture with the water stream in the turbulent mixing zone.

It is therefore one object of this invention to provide an improved method for producing sulfur particles. It is another object to provide an improved method of producing porous sulfur particles which can be easily crushed or otherwise abraded to form finely divided sulfurs. Another object is the provision of an improved method for controlling the crushing strength of porous sulfur particles formed by the turbulent mixing of molten sulfur and water. Another object is the provision of a method for producing porous sulfur particles having either high or low relative crushing strength as desired.

Therefore, in accordance with one embodiment of this invention, the crushing strength of porous sulfur particles formed by the high velocity, turbulent mixing of molten sulfur and water streams is controlled by controlling the temperature of the molten sulfur injected into the water stream. This procedure affords several advantages. Porous particles of consistent crushing strength can be produced. Conversely, the sulfur temperature can be changed to obtain particles having either higher or lower crushing strength as desired. The range of temperature permissible is prescribed at the lower end by sulfur melting point, i.e., about 238° F., and on the upper end by the point at which molten sulfur becomes excessively viscous and difficult to pump or force through orifices or nozzles, i.e., about 340° F. Particles having high crushing strength can be obtained simply by operating at the higher end of this permissible range, e.g., at least about 280° F.

Within the context of this disclosure and appended claims, the term crushing strength refers to resistance to crushing, or other types of mechanical attrition relative to the strength of particles produced under otherwise identical conditions although at a different temperature. Thus a particle produced from sulfur having a relatively high temperature, e.g., about 320° F. will have a crushing strength greater than that of particles produced under otherwise identical conditions at a lower temperature such as 260° F.

Crushing strength can be expressed in absolute units, e.g., psi. However, the absolute force applied to crush a given particle is; relative to the test by which it is determined. This is due to the influence of factors such as surface area, surface shape and friction coefficient, particle size, internal and surface structure, and the like. The influence of any one of these or other variables on can vary from one environment to the next. Thus, this property is best described in relative terms with respect to this invention which constitutes a method of controlling the crushing strength on a relative basis.

Not the least of the factors affecting crushing strength is particle size and, for that matter, the particle size distribution of a population of particles having some average hardness. As described in more detail hereinafter, particle size in turn is a function of other process variables such as water velocity, sulfur velocity, relative water/sulfur mass flow rates and the severity of turbulent mixing at the intersection of the sulfur and water streams which, at least to a large extent, controls the fragmentation and cooling rate of the sulfur stream.

Nevertheless, crushing strength can be controlled by controlling the molten sulfur temperature at a point within the operable range of about 238° to about 340° F. in proportion to the desired crushing strength. Particles obtained within this range of temperatures will usually have crushing strengths of about 350 to about 800 psi. Absent the influence of other variables such as particle size, crushing strength is a direct function of molten sulfur temperature. Thus crushing strength can be increased by increasing sulfur temperature or decreased by decreasing temperature. Thus these methods can be used to produce particles having crushing strength values, determined by the procedure described in the examples, of at least 500, preferably at least 550 psi at sulfur temperatures of at least 270° F., preferably at least 300° F. Conversely, particles having crushing strength of less than 500 psi, preferably less than 450 psi can be obtained by controlling sulfur temperature at a level below about 270° F., preferably below 260° F. These values are obtained by the analytical and mathematical procedures discussed hereinafter, and apply to particle sizes ranging between 8 to 14 mesh U.S. Standard Sieves.

The several aspects of this invention will be better understood by reference to the drawings of which FIG. 1 is a correlation illustrating the relationship between crushing in psi strength and mesh size of the product particles derived by analysis and separation of a single product population;

FIG. 3 is a side-sectional view of a preferred sulfur-water mixing apparatus.

FIG. 4 is a sectional view taken along the axis of the apparatus of FIG. 3 at section A—A.

FIG. 5 is a side-sectional view of an alternative mixing apparatus suitable for producing the porous sulfur particles described herein.

Figure 1:
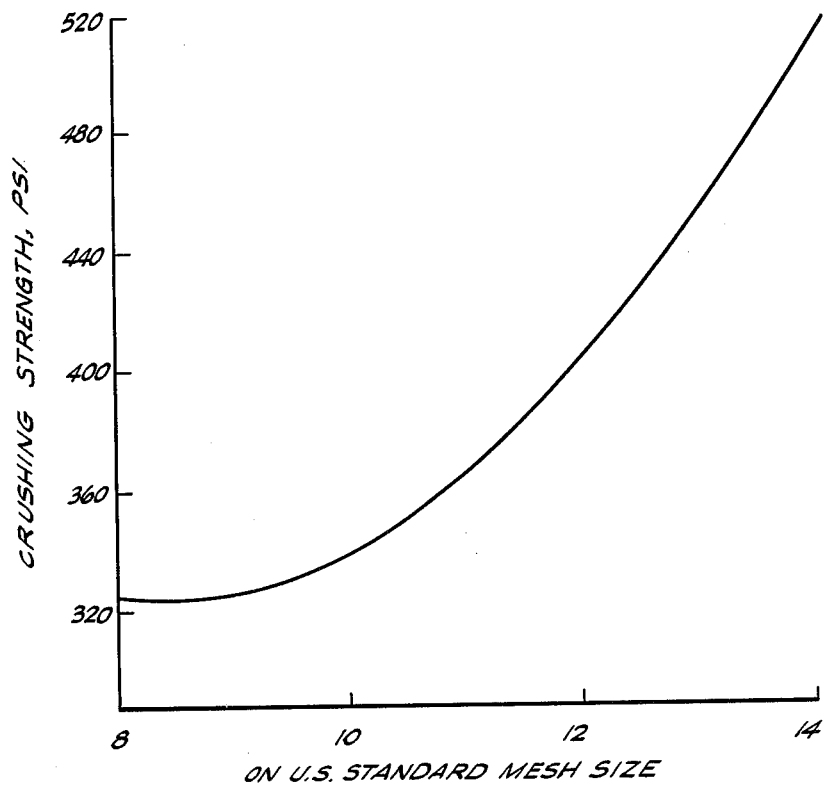

While the forms of apparatus illustrated in the drawings and described specifically herein are preferred means of producing the porous sulfur particles, they are, of course, not the only means of accomplishing this objective. It is essential only that means be provided to form high velocity streams of molten sulfur and water and to align these two streams such that they intersect and produce a highly turbulent zone within which the molten sulfur is "captivated" and completely surrounded by water. The turbulence thus created breaks the molten sulfur up into very small particles and, by a procedure not fully understood, results in the formation of highly porous particles of non-dusting sulfur. The sulfur and water streams can be sprayed either into the open atmosphere or into a closed container, with the spray being directed to place the resultant particles in the desired location. As a practical matter a longitudinal distance of at least about 20 feet should be provided between the end of the sulfur and water guns and the storage area so as to provide sufficient time for complete solidification of the sulfur before it contacts any surface or other sulfur particles.

Preferred devices are those which provide the following conditions: The water gun should have a constriction discharge nozzle to provide a water stream having a relatively high velocity on the order of about 3 to about 90 feet per second sufficient to form a spray having a vena contracta at a distance from the end of the barrel about 0.2 to about 15 pipe diameters downstream of the nozzle. The sulfur gun should also have a nozzle sufficient to provide a longitudinal velocity of about 3 to about 90 linear feet per second, and should be aligned substantially parallel to the water stream to intersect the water stream within the area of the vena contracta at an angle of about 0° to about 20° to the longitudinal axis of the water stream.

These conditions would generally be sufficient to captivate and disperse the sulfur within the water stream without allowing penetration of the water phase by the molten sulfur. Obviously the relative sulfur and water flow rates must be controlled at a level sufficient to provide adequate cooling and dispersion of the molten sulfur. Accordingly, this system should be operated at a water flow rate corresponding to at least about 0.6 weight part water per weight part sulfur, sufficient to disperse the molten sulfur stream into fine droplets and to cool and solidify those droplets into porous sulfur particles. Preferred water rates are about 0.6 to about 10 weight parts water per weight part sulfur. Water rates substantially above the upper limit generally result in no substantial benefit and serve only to increase operating cost. When the longitudinal axes of the sulfur and water guns are aligned at the same angle, i.e., an intersection angle of zero degrees corresponding to the lower limit of the preferred range, it is necessary that the constriction discharge nozzles of the water and sulfur guns be coaxial as illustrated in FIG. 3. Other intersect angles can be obtained by using separate water and sulfur guns, each of which can be aligned at an angle that will provide for intersection of the two streams in an area sufficient to captivate and disperse the sulfur into finely divided porous particles.

Water temperature can be varied over a very wide range, e.g., about 32° F. up to the boiling point of 212° F. although ambient temperatures, i.e., on the order of 50° to 100° F. are sufficient and are preferred. Specific water temperatures within the preferred range are not critical. However, outside this range the flow rate of the water stream must be taken into account. This is a function of not only water temperature but of water rate, relative water and sulfur mass rate, sulfur temperature, ambient temperature and mixing efficiency in the turbulent zone. Thus a lower water/sulfur mass ratio can be employed with extremely low water temperatures, i.e., 32° F., although this situation is seldom encountered.

Referring now to FIGS. 3 and 4, the prilling device used in carrying out the method comprises a set of concentric conduits 68, 76, 78 and 90 which are secured to flange 54 having radially spaced bolt holes 118. Secured in the base of flange 54 is a sleeve 52 which has one end rolled into a frustoconical shape and is welded to the outer surface of conduit 76. Ring 51 is mounted within sleeve 52 and the ends of conduits 76 and 78 are butt welded to the ring. The inner conduit 90 is supported by conduit 78 with spacers or lugs 110.

The annular passageway 74 between conduits 76 and 78 is in communication with the inner conduit 90 by the U-shaped conduit 84 which fits into an annular seat about the inner periphery of conduit 90. The under surface of conduit 78 is crimped slightly and a semi-circular cut is made in ring 51 to define an opening 82 (see FIG. 4) into which is fitted the remaining end of U-shaped conduit 84 which thereby provides communication between annular passageway 74 and conduit 90.

Conduit 68 has one end rolled into a frusto-conical shape which mates with and is welded to the outer periphery of conduit 76 at a point downstream of sleeve 52 to provide an assembly having a neck of reduced diameter. Nozzles 72 and 73 are carried by conduit 76 at this neck portion to provide communication with annular passageway 74. Nozzles 62 and 64 are carried by conduit 68 to provide communication with annular passageway 66 defined by conduits 68 and 76.

At its opposite end, conduit 68 is opened. Preferably, a nozzle 104 is formed by a sleeve secured to the inner periphery of conduit 68 to reduce its diameter and provide an annular orifice, thereby serving as a discharge nozzle. Nozzle 104 can be permanently attached to conduit 68 or, as shown, can be removably attached by threaded joint 106. If desired, nozzle 104 can have an arcuate inner surface to define a smoothly converging entrance to the annular orifice or, as shown, can have a simple conically tapered entrance.

The end of conduit 76 is rolled into a frusto-conical shape and is welded to conduit 78 to close annular passageway 74. Conduit 78 is open-ended and bears an annular lip 108. Conduit 90 supports a conical member 96 having a hollow neck 100 that fits over conduit 90 and is removably secured thereto by threads 102. Alternatively, neck 100 could be permanently welded to conduit 90. Neck 100 partially obstructs the open end of annular passageway 56 and thereby serves as a discharge nozzle. As with nozzle 104, the nozzle which is thus formed by neck 100 can have a smoothly converging throat by shaping the outer surface of neck 100 into an arcuate path along the longitudinal axis or, as shown, the inner end of neck 100 can simply be tapered. Conical member 96 is preferably hollow and closed with end cap 93 to define a chamber 92 that is in communication with conduit 90. One or more holes 94 are bored through the underside of conical member 95.

In operation, sulfur flows into an annular passageway 56 as shown in FIG. 3. The sulfur is maintained in a molten condition by indirect heat exchange means. These means comprise conduits 76 and 90 which define annular passageway 74 and central passageway 88 for a heating fluid which is preferably steam. Steam flows into nozzle 72 through annular passage 74 and out passage 73.

Water is forced into nozzles 62 and 64 and through annulus 66. Nozzle 104 constricts the water discharge from passageway 66 to produce a high exit velocity. The molten sulfur flows through the passageway 56, the discharge of which is partly restricted by the nozzle formed by neck 100 to deflect the sulfur stream towards the outer water stream. The exit velocity of sulfur is increased as it is discharged through the constricted throat of the nozzle formed by neck 100 and the sulfur is thus discharged at a high velocity out of the sulfur conduit and into contact with conical member 96 which serves as a baffle and further deflects the sulfur into contact with the water stream.

Thus the molten sulfur and water are contacted in the highly turbulent region at the discharge end. The sulfur is dispersed into discrete droplets presumably containing some water and is solidified in the atmosphere by the joint action of water and air.

The sulfur particles and water fall onto a storage area wherein water readily drains from the particles leaving a bulk amount of dry, porous sulfur prills.

Blending can occur if the discharges are substantially parallel and in close proximity. Thus, it has been found that if the conduit 76 is eliminated, the streams will blend without conical deflector 96.

The water conduit is shown in FIG. 3 as terminating a minor distance, e.g., 1–10% of the length of the conduit, prior to termination of the sulfur conduit. This feature, in combination with lip 108, prevents sulfur from flowing into the water conduit and plugging any portion of the discharge of the water passageway during shutdown of the device. Alternatively, conduit 68 can be extended to terminate substantially at the same point along the longitudinal axis as conduit 78 to improve mixing of the water and sulfur streams.

Conical member 96 deflects the sulfur stream into contact with the water stream. Some of the water stream also impinges against deflector 96 insuring intimate contacting. The side walls of member 96 can be inclined from the longitudinal axis of the device from 3° to about 35°, preferably from 5° to about 25°, with the length of the conical member 96 correlated with its sidewall angle to achieve the above objectives. This angle should not be great enough to impart a radial velocity vector to the sulfur sufficient to penetrate through and escape from the water stream.

It is also preferred that the sidewall angle (not shown) and/or length of the conical member be such that at least a substantial amount, e.g., 40–100 percent, preferably 70–100 percent, of the water stream is not deflected. This retains a substantial velocity of the combined streams useful in conveying and distributing sulfur to the storage location. To achieve this objective, the diameter of the base of conical member 96 and the position of member 96 are selected so that the base does not extend into the longitudinal extension of annular passageway 66. The angle and length of member 96, as well as the sulfur and water exit velocities, affect the mixing of water and sulfur and the properties of the sulfur particles. The properties of the sulfur particles can be varied by using conical members of varied length and inclination angles.

Steam is introduced into the prilling device in sufficient quantity and/or superheat to insure that the sulfur is retained in the molten state as it flows through the prilling device. Steam flows into passageway 74 defined by pipes 76 and 78 and through space 82 defined by U tube 84 into passageway 88 defined by conduit 90. The steam also flows through conduit 90 and into conical member 96 to insure that the sulfur does not solidify on and adhere to the exterior of conical member 96. Condensate is removed through nozzle 73 and through bore 94 in conical member 96.

Alternatively, steam may be introduced directly into passsgeway 88 by a nozzle communicating with conduit 90. In this manner sulfur is heated only from the interior of the device and the water conduit is in direct communication with the sulfur conduit with no intervening steam jacket. This embodiment has the advantage that better mixing of the sulfur and water stream can be achieved at the exit end of the device since there is a minimum of area separating the respective streams as they flow out of the prilling device.

FIG. 5 illustrates an alternative mixing device comprising nozzle 150 having a tapped entrance into which conduit 151 is secured and an orifice 152 communicating with tapped bore 153 to which conduit 154 is secured. Conduit 151 can be attached to a pressured water supply and conduit 154 communicates with a molten sulfur source.

The entire assembly can be heated, e.g., electric heating tape can be wrapped about the nozzle and conduit 154. Alternatively, only conduit 154 can be heated by steam or heating tape tracing.

The principal variables in addition to sulfur temperature include relative stream velocities and relative mass flow rates, both of which influence mixing, turbulence at the point of stream intersection, and cooling rate. These variables, other than sulfur temperature, are also primarily responsible for determining particle size and distribution of the porous particle population. Water and sulfur velocities are determined by mass flow rate and nozzle cross-section. They are correlated one with the other, generally within the following ranges to obtain porous particles having the desired degree of porosity, surface area and particle size.

Table 1

|  | Broad | Intermediate | Narrow |
| --- | --- | --- | --- |
| Exit water velocity, feet/sec | 3–90 | 10–60 | 25–45 |
| Exit sulfur velocity, feet/sec | 3–90 | 10–60 | 25–45 |
| Ratio, water velocity/sulfur velocity | 0.4:1–20:1 | 0.5:1–5:1 | 0.7:1–2:1 |
| Ratio, water mass flow rate/sulfur mass flow rate | 0.2:1–20:1 | 0.6:1–10:1 | 0.7:1–2:1 |

Figure 2:
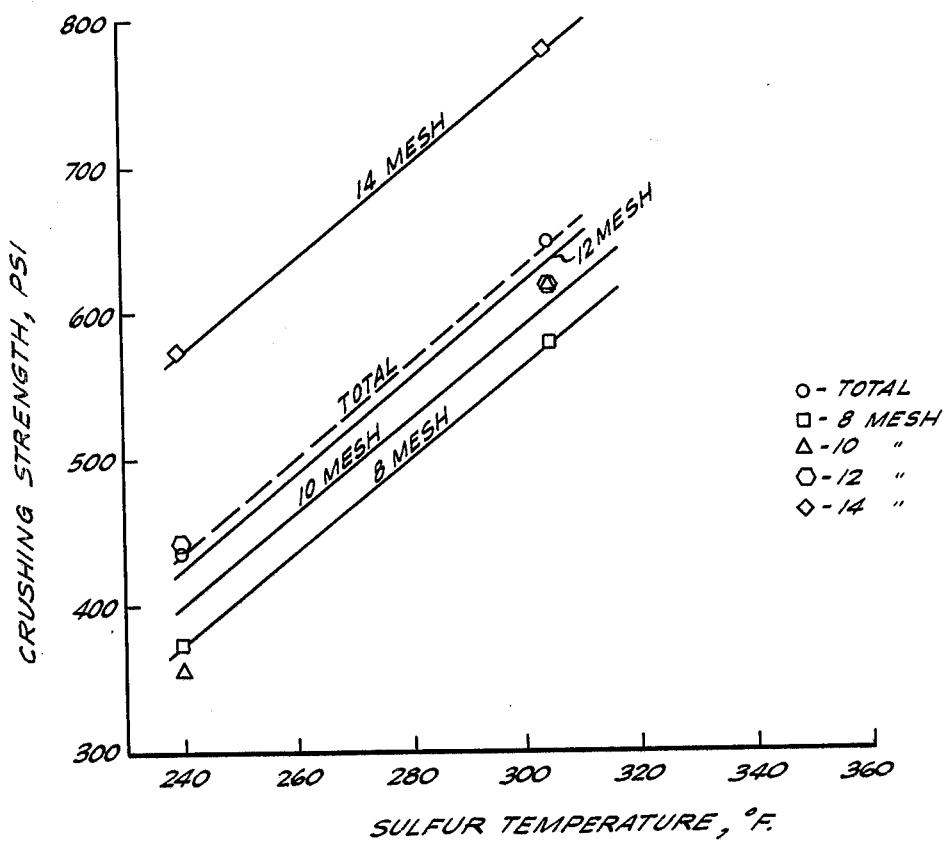
FIG. 2 is a correlation illustrating the relationship between molten sulfur temperature and particle crushing strength for several different particle sizes. This figure also indirectly illustrates the relationship between particle size and crushing strength.

These variables also affect crushing strength since they influence particle size which has a substantial effect on crushing strength, as illustrated in FIGS. 1 and 2. However, that apparent difference is actually a function of the analytical technique employed to determine crushing strength rather than a real difference in crushing strength per se.

More dense particles may be produced at low relative flow rates. Additionally, the absolute and relative sulfur and water velocities must be sufficient to form a turbulent region outside the conduits to mix the sulfur and water and contain the sulfur within the water stream or in intimate contact therewith as the streams flow through the atmosphere. The water velocity, however, should not be too high as it has been found that higher water velocities tend to increase the fines production which may or may not be desired.

The preferred sulfur particles have diameters on the order of about 0.02 to about 0.11 inch and bulk densities of about 1.9 or less, generally about 1.3 grams per cc or less, preferably about 0.9 to about 1.3 grams per cc. Particle porosities should be at least about 0.04, generally about 0.04 to about 0.15 cc per gram. Internal surface area should be at least about 20 and preferably between about 30 and 100 square centimeters per gram.

The principles of numerous forms of apparatus suitable for determining crushing strength or grindability, and for comminuting such particles, are well known in the art. Detailed descriptions of both principles and hardware are discussed in the *Chemical Engineers Handbook*, John H. Parry 4th Ed., McGraw-Hill (1963), Chapter 8, pages 1 through 59. This text observes that grindability is a function of the degree of particle size reduction, apparatus type, i.e., efficiency, and energy consumption. However, for purposes of simply determining particle hardness, a parameter which has applicability to evaluation of grindability at least on a relative basis, the following examples employed a relatively simple apparatus.

The apparatus comprised a vertically disposed air-driven plunger having a flat lower surface for engaging sample particles placed on the flat sample holder immediately beneath the plunger. After positioning a single sample particle, air is supplied slowly to the cylinder driving the plunger, the rate of application being controlled by a restriction needle valve in the air line upstream of the cylinder. This procedure provides for a slow pressure buildup in the cylinder which is continuously read by a pressure gauge between the needle valve and cylinder. Thus the gauge allows continuous readout of the air pressure in the cylinder which can be converted directly to pounds force applied to the plunger (knowing the cross-sectional area of the plunger-driving piston). Pressure is allowed to build up continuously in the cylinder until sample failure, i.e., until the particle cracks into two or more pieces. The pressure applied at the point of failure is used to determine the force on the plunger at the point of particle failure. The crushing strength in pounds per square inch is determined from this value using the mathematical transform assuming an ideal cylindrical particle as discussed hereinafter.

The best procedure for analyzing populations of varying size particles is to segregate the sample into relatively narrow particle fractions, e.g., as discussed in the examples, then determine the crushing strength of a plurality of particles from each fraction. The number average of these values is representative of the selected fraction. Comparison of these averages for each size category establishes particle size influence on crushing strength while conversion of the pounds force values to psi by assuming an ideal cylinder having the diameter of the sample particles minimizes particle size effect and allows expression of the results in conventional units.

EXAMPLES 1 through 8

These examples illustrate the influence of operating parameters other than molten sulfur temperature on particle size and particle size distribution. The apparatus was similar to that illustrated in FIGS. 3 and 4 with minor modifications. Pipe 68 was terminated at about the same point as pipe 78 and the annular steam space 74 and conduit 76 were eliminated. Water in sulfur were thus separated only by common pipe 78. The barrel of the device was aligned at an angle of 45° to the horizon pointing upwardly, while the apex angle of cone 96 attached to pipe 90 was about 20°. The base diameter of cone 96 was about equivalent to the diameter of pipe 78 and the length of the cone was equivalent to the diameter of pipe 78.

Molten sulfur at a temperature of about 280° F. was pumped from steam-heated tanks into passageway 56 of device 2. Water at ambient temperature, e.g., about 60° F., was pumped into passageway 66. These streams were sprayed out of the device and into the atmosphere at the elevation of approximately 50 feet above the ground. The sulfur particles accumulated in an area about 30 or 40 feet from the device.

Water and sulfur rates were continuously monitored. Cross-sectional area of the sulfur and water conduit exits were varied from run to run by inserting larger or smaller restriction means 100 and 104 respectively to obtain different sulfur and water stream velocities at constant mass flow rates. Representative sulfur particles were collected for analysis after each run. Sulfur and water mass flow rates and stream velocities are given in the following Table.

Table 2

| Example | Sulfur Velocity, ft./sec. | Water Velocity, ft./sec. | Sulfur Flow, lbs./min. | Water Flow, lbs./min. |
|---|---|---|---|---|
| 1 | 31.4 | 35 | 720 | 754 |
| 2 | 31.4 | 40 | 720 | 861 |
| 3 | 31.4 | 27 | 720 | 968 |
| 4 | 33.8 | 27 | 1,020 | 968 |
| 5 | 33.8 | 40 | 1,020 | 861 |
| 6 | 33.8 | 36 | 1,020 | 775 |
| 7 | 33.5 | 34 | 1,020 | 733 |
| 8 | 33.5 | 38 | 1,020 | 820 |

These particles were allowed to dry thoroughly to a water content less than 1 weight percent and were screened on standard U.S. screens. The following results were obtained:

Table 3

| | Percent Sulfur Particles On Screen | | | | | | | | |
|---|---|---|---|---|---|---|---|---|---|
| Screen No. | 4 | 6 | 8 | 10 | 14 | 20 | 50 | 100 | 200 |
| Ex. No. | | | | | | | | | |
| 1 | 17.5 | 26.6 | 24.5 | 15.5 | 10.2 | 4.2 | 0.6 | 0.3 | 0.2 |
| 2 | 10.2 | 22.8 | 26.0 | 17.3 | 13.5 | 7.1 | 1.7 | 0.7 | 0.5 |
| 3 | 5.2 | 20.7 | 28.2 | 18.4 | 13.0 | 7.5 | 3.1 | 2.1 | 1.2 |
| 4 | 33.9 | 24.8 | 19.9 | 9.8 | 5.5 | 3.3 | 1.9 | 0.8 | 0.5 |
| 5 | 16.3 | 24.9 | 24.3 | 15.3 | 10.9 | 5.2 | 1.8 | 0.6 | 0.44 |
| 6 | 11.3 | 20.2 | 23.3 | 16.9 | 13.8 | 9.5 | 3.7 | 0.9 | 0.4 |
| 7 | 28.4 | 15.7 | 16.7 | 12.5 | 10.6 | 8.7 | 5.1 | 1.6 | 0.6 |
| 8 | 25.6 | 19.0 | 20.5 | 13.0 | 10.0 | 7.5 | 3.6 | 1.4 | 0.5 |

The sulfur particles of Examples 6 through 8 were relatively tacky and tended to agglomerate. This agglomeration was attributed to a relatively low water flow rate relative to the sulfur mass flow rate. Accordingly, the water/sulfur mass flow rate ratio should be higher than about 0.6, preferably above about 0.7.

EXAMPLE 9

This example illustrates the apparent influence of particle size on crushing strength. The operation of Examples 1 through 8 was repeated at sulfur and water mass rates and velocities within the described ranges, a molten sulfur temperature of 305° F. and a water temperature of about 650° F. The operation went smoothly and produced non-tacky, non-agglomerated, porous sulfur particles. A sample of these particles was recovered and segregated into four U.S. mesh size classifications: −4, +8; −8, +10; −10, +12; and −12, +14. Twenty-five particles of each size class were crushed separately using the catalyst crushing strength tester unit described above. The results of each sample class were treated statistically by the methods of variance and co-variance to establish mean crushing strength and standard deviation. While there was substantial variation in the force applied to the plunger for each size class, the results for each class exhibited a highly normal distribution about the mean allowing sensitive comparisons.

The raw data (recorded applied force) indicated consistently higher crushing strength values for the larger particle classes. This was due to the fact that the larger contact area between the anvil and the larger particles overwhelmed all other effects. While the raw values of applied force are valid for internal comparisons within each size class, they are misleading with respect to crushing strength for a given particle. For instance, the larger, more porous particles were more easily crushed than were smaller, less porous particles produced under the same conditions. However, the applied force registered by the test apparatus was higher for the larger particles due to the increased contact area between the apparatus and particle.

This problem was obviated by converting the data to units of pounds force per square inch (psi) by a mathematical transform using a cylindrical model. Particle shape was idealized to that of a regular right cylinder having a diameter corresponding to the mesh opening of the standard screen on which the particles were retained. By this procedure, area corrections were obtained for each size class as follows:

Table 4

| Standard Mesh Size | Area Correction Term X 10³ |
|---|---|
| +8 | 6.90 |
| +10 | 4.86 |
| +12 | 3.43 |
| +14 | 2.42 |

The corrected data conformed to the prediction that crushing strength increases with decreasing particle size, i.e., decreasing porosity or increasing density as illustrated in FIG. 1.

The following two examples illustrate the influence of molten sulfur temperature on crushing strength.

EXAMPLE 10

The operation of Examples 1 through 8 was repeated at a controlled molten sulfur temperature of 238° F., a water temperature of about 65° F. and fixed sulfur and water mass rates within the described ranges. Product samples were screened to obtain discrete particle size fractions which were analyzed by the crushing strength test described in Example 9. The data were treated by the transform and statistical variance procedures also described in that example. These results are reported in Table 5 and are illustrated graphically in FIG. 2.

EXAMPLE 11

The operation and data anaylsis techniques described in Example 10 were repeated under identical conditions with the exception that the molten sulfur temperature was increased to 305° F. The results of this operation are reported in the following table.

Table 5

| Effect of Temperature on Mean Crushing Strength Mean Crushing Strength, psi[1] | | |
|---|---|---|
| Particle Size | Example 10 - 238° F. | Example 11 - 305° F. |
| Total | 439 A | 652 C |
| on 8 mesh | 376 AB | 585 C |
| on 10 mesh | 358 B | 621 C |
| on 12 mesh | 446 A | 621 C |
| on 14 mesh | 577 C | 782 D |

[1]Values which do not have a common letter differ significantly at a 99% confidence level.

The data presented in Table 5 and in FIG. 2 illustrate two points. Crushing strength increases substantially as molten sulfur temperature is increased. That parameter also increases in a step-wise manner as particle size is reduced, i.e., as porosity is reduced.

I claim:
1. The method of producing porous sulfur particles having diameters between about 0.02 and 0.4 inch, densities between about 0.9 and about 1.3 grams per cc, pore volumes between about 0.04 and about 0.15 cc per gram including the steps of:
    (a) passing a pressurized stream of water through a first conduit having a constriction discharge nozzle and discharging said water from said nozzle at a high linear velocity of about 3 to about 90 feet per second to form a water spray having a vena contracta of about 0.2 to about 15 pipe diameters downstream of said nozzle;
    (b) passing a pressurized stream of molten sulfur through a second conduit also having a constriction discharge nozzle and discharging said sulfur stream from said nozzle at a high velocity of about 3 to about 90 feet per second;
    (c) blending said sulfur and water streams by discharging said sulfur stream into said vena contracta of said water spray in a direction substantially parallel to said water spray so that said sulfur stream has a radial velocity vector relative to said water stream insufficient to cause said sulfur to penetrate through said water spray, and said sulfur is captivated and surrounded by said water spray and forms a single spray comprising a heterogeneous mixture of intimately mixed sulfur droplets and water droplets;
    (d) controlling the flow rates of said water and sulfur streams to form a turbulent region outside of said conduits and provide relative mass flow rates of about 0.6 to about 10 weight parts water per weight part sulfur, disperse said sulfur stream into said sulfur droplets, and cool and solidify said sulfur droplets into said porous sulfur particles having particle diameters of about 0.02 to about 0.4 inch, densities of about 0.9 to about 1.3 grams per cubic centimeter and pore volumes of about 0.04 to about 0.15 cubic centimeters per gram; and
    (e) controlling the crushing strength of said porous particles by controlling the temperature of said molten sulfur injected into said water spray at a level within the range of about 238° to 340° F., which temperature level is proportional to the desired crushing strength of said sulfur particles.

2. The method of claim 1 wherein said temperature of said molten sulfur is controlled at a level of at least about 270° F. to obtain said particles having high crushing strength.

3. The method of claim 1 wherein said temperature of said molten sulfur is controlled at a level below about 260° F. to obtain said particles having low crushing strength.

4. The method of claim 1 wherein said sulfur particles having a crushing strength between about 350 and about 800 psi are obtained by controlling said sulfur temperature within said range of about 238° to about 340° F., which method includes the steps of determining the crushing strength of said sulfur particles produced by said method, adjusting the temperature of said molten sulfur as a function of the deviation between the observed crushing strength and the desired crushing strength of said particles, increasing said temperature if said observed crushing strength is below said desired crushing strength and reducing said temperature if said observed crushing strength is above said desired crushing strength.

* * * * *